(12) United States Patent
Modarressi

(10) Patent No.: US 10,104,067 B2
(45) Date of Patent: *Oct. 16, 2018

(54) PROVIDING A MASKED SHORT MESSAGE SERVICE IN A WIRELESS NETWORK

(71) Applicant: AT&T Intellectual Property I, L.P., Atlanta, GA (US)

(72) Inventor: Abdi R. Modarressi, Johns Creek, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,249

(22) Filed: Jun. 26, 2017

(65) Prior Publication Data

US 2017/0295163 A1 Oct. 12, 2017

Related U.S. Application Data

(63) Continuation of application No. 14/984,877, filed on Dec. 30, 2015, now Pat. No. 9,693,230, which is a continuation of application No. 14/531,672, filed on Nov. 3, 2014, now Pat. No. 9,565,564, which is a continuation of application No. 13/708,694, filed on Dec. 7, 2012, now Pat. No. 8,880,032.

(51) Int. Cl.

| H04W 12/06 | (2009.01) |
|---|---|
| H04W 12/08 | (2009.01) |
| H04L 29/06 | (2006.01) |
| H04W 4/14 | (2009.01) |
| H04W 88/02 | (2009.01) |
| H04W 88/18 | (2009.01) |

(52) U.S. Cl.
CPC ........ *H04L 63/083* (2013.01); *H04L 63/0876* (2013.01); *H04W 4/14* (2013.01); *H04W 12/06* (2013.01); *H04L 65/1063* (2013.01); *H04W 88/02* (2013.01); *H04W 88/184* (2013.01)

(58) Field of Classification Search
CPC ........... H04W 4/02; H04W 4/12; H04W 4/14; H04W 88/184
USPC ........ 455/411, 412.1, 412.2, 414.1; 726/4, 7
See application file for complete search history.

(56) References Cited

U.S. PATENT DOCUMENTS

| 8,880,032 B2 | 11/2014 | Modarressi |
| 2006/0047844 A1 | 3/2006 | Deng |
| 2010/0233992 A1 | 9/2010 | Nooren |
| 2010/0298011 A1 | 11/2010 | Pelley |
| 2013/0225153 A1 | 8/2013 | Kim |

*Primary Examiner* — Sam Bhattacharya

(57) ABSTRACT

A method and apparatus for providing a masked short message service in a wireless network are disclosed. For example, the method receives a message from a first endpoint device directed to a second endpoint device, wherein the message indicates that the message is a masked short message service message, and forwards the masked short message service message with a code towards the second endpoint device. In one example, the second endpoint device parses the message and executes instructions contained therein, e.g., for sending a regular SMS with content derived from masked SMS, making a call, playing music, finding location by invoking an API, sending a file or a picture and any other functions that the second endpoint device may be capable of doing. The masked short message service provides a method for remotely controlling a 2G/3G mobile device through a computer or another mobile device.

20 Claims, 5 Drawing Sheets

PROVIDING A MASKED SHORT MESSAGE SERVICE IN A WIRELESS NETWORK

This application is a continuation of U.S. patent application Ser. No. 14/984,877, filed Dec. 30, 2015, now U.S. Pat. No. 9,693,230, which is a continuation of U.S. patent application Ser. No. 14/531,672, filed Nov. 3, 2014, now U.S. Pat. No. 9,565,564, which is a continuation of U.S. patent application Ser. No. 13/708,694, filed Dec. 7, 2012, now U.S. Pat. No. 8,880,032, all of which are herein incorporated by reference in their entirety.

The present disclosure relates generally to communication networks and, more particularly, to a method and apparatus for providing a masked short message service in a wireless network, e.g., in a 2G or 3G wireless network and the like.

BACKGROUND

As Internet usage continues to grow, more and more customers are accessing communications services via a mobile device, e.g., a cell phone, a smart phone, a tablet computer, etc. For example, a customer may receive, short message service (SMS) messages, multimedia content, voice calls, etc. via his/her smart phone. The smart phone transmits and receives voice and data packets to and from the service provider's network.

However, when a customer forgets his/her smart phone at another location, the customer is unable to access the services.

SUMMARY OF THE DISCLOSURE

In one embodiment, the present disclosure teaches a method, computer readable medium and apparatus for providing a masked short message service in a wireless network. For example, the method receives a message from a first endpoint device directed to a second endpoint device, wherein the message indicates that the message is a masked short message service message, and forwards the masked short message service message with a code towards the second endpoint device.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly teaches a method and apparatus for providing a masked short message service, e.g., in a 3G wireless network and the like. Namely, the teachings of the present disclosure can be applied for other wireless networks or cellular networks (e.g., 2G network, and the like), wherein a masked short message service is beneficial to customers.

Broadly defined, 3GPP is a global effort to define a wireless communication system specification. 2G is a second generation cellular network technology, 3G is a third generation cellular network technology, and 4G is a fourth generation cellular network technology. A Global System for Mobile (GSM) communications is an example of a 2G cellular technology and a Universal Mobile Telecommunications System (UMTS) is an example of a 3G cellular network technology. In accordance with the 3GPP global effort, a General Packet Radio Service (GPRS) refers to a communications service used to transfer data via a cellular network. GPRS is available to users of a 2G cellular system GSM. The GPRS provides an enhancement to the GSM system so that data packets are supported. In addition, in 3GPP release 8, an LTE (long term evolution) standard is provided as a set of enhancements to the UMTS. The enhancement focuses on adopting 4th Generation (4G) mobile communications technology to include an all Internet Protocol (IP) end-to-end networking architecture. An LTE is an example of a 4G cellular network technology.

Figure 1:
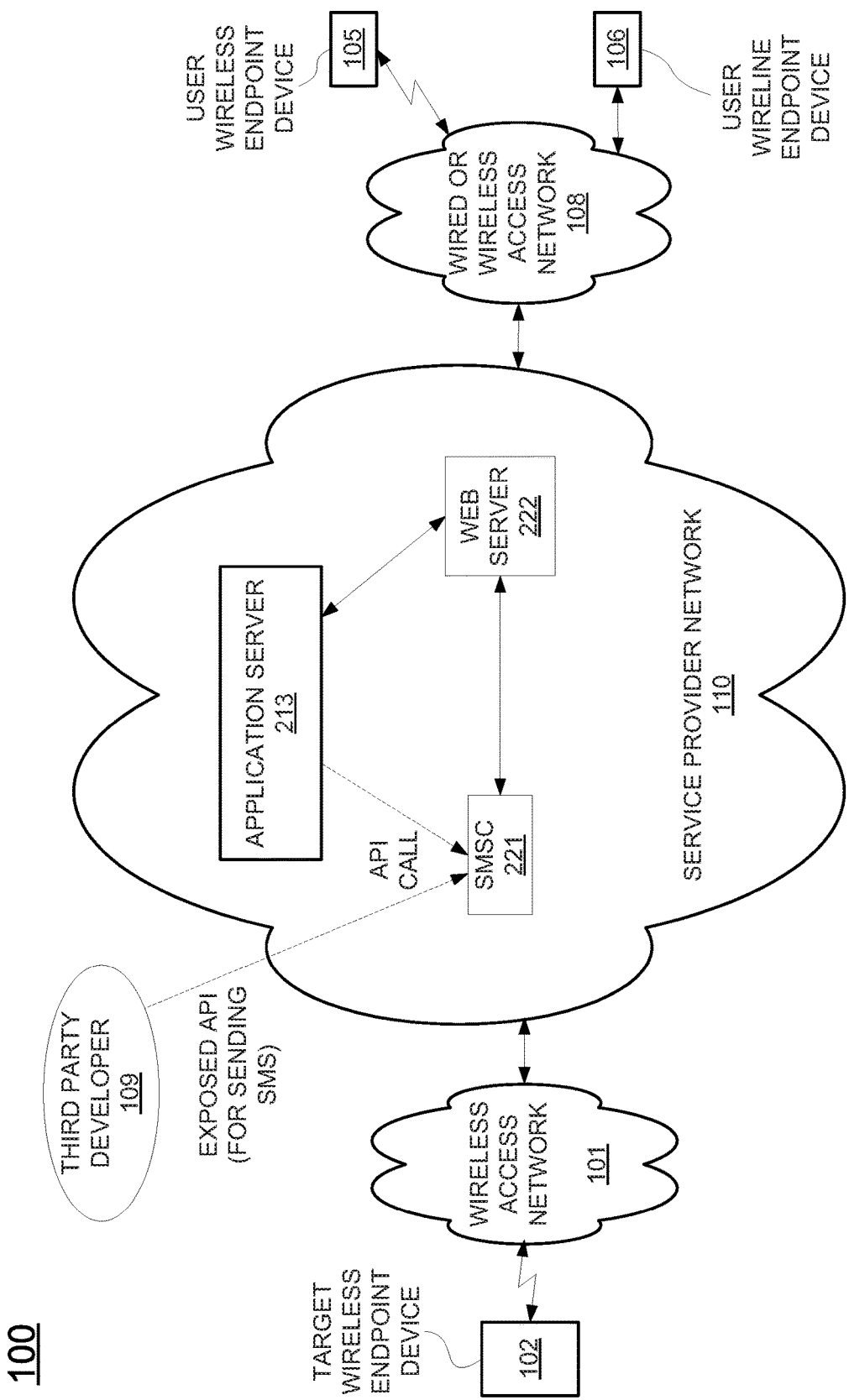
FIG. 1 is a block diagram depicting an illustrative network related to the current disclosure for providing a masked SMS service.

To better understand the present disclosure, FIG. 1 illustrates an example network 100, e.g., a packet data network part of which may use the Internet Protocol (IP) related to the present disclosure. An IP network is broadly defined as a network that uses Internet Protocol to exchange data packets.

In one embodiment, the network 100 may comprise a plurality of endpoint devices 102, 104 and 105 configured for communication with the core network 110 (e.g., a packet data based core backbone network supported by a service provider) via an access network 101 and access network 108.

The endpoint devices 102, 104 and 105 may comprise customer or user endpoint devices such as personal computers, laptop computers, Personal Digital Assistants (PDAs), wireless endpoint devices, mobile phones, smart phones, cellular phones, tablet computers, PBXs, aggregate endpoints (e.g., an aggregate endpoint that employs a Session Initiation Protocol (SIP) user agent to interact with the network on behalf of a plurality of endpoints aggregated behind it), wireline endpoint devices and the like. The access networks 101 and 108 serve as conduits to establish a connection between the endpoint devices 102, 104 and 105 and the core network 110. The access networks 101 and 108 may each comprise a Wireless Access Network, a cellular network, a Digital Subscriber Line (DSL) network, a broadband cable access network, a Local Area Network (LAN), a $3^{rd}$ party network, and the like. It should be noted that although various networks are shown as separate networks in FIG. 1, it is possible that functions performed by these networks can be combined into fewer networks or expanded into a greater number of networks depending on the deployment requirements.

A customer may subscribe to a short message service (SMS) from a network service provider that enables the subscriber to send and/or receive SMS messages via a mobile device (e.g., a cell phone or a smart phone). In one embodiment, an SMS message is a short message containing a maximum of 140 bytes of user data transported in a mobile telecommunication network. The SMS message is a binary string that contains all the necessary information to form the message header needed for transportation and the message body containing the payload. SMS messages are created by mobile phones or similar devices. These devices can send and receive SMS messages by communicating with a wireless network. There are two types of SMS messages: Mobile-originated (MO) messages and Mobile-terminated (MT) messages. The type of message depends on whether the mobile phone is receiving or sending the SMS message. MO messages are sent by the mobile phone to the wireless network. MT messages are received by the mobile phone from the wireless network.

In a GSM network, the transportation of SMS messages is accomplished via a GSM signaling path. The Short Message Service Center (SMSC) 221 of the GSM network is responsible for receiving the SMS message, storing the message, and delivering the message to the intended recipient. For GPRS networks, the SMS messages are transported as GPRS packets.

For example, a service provider may receive a mobile originated message directed towards another mobile device. The service provider receives and stores the SMS message. The message is then forwarded to the intended recipient as a mobile terminated message. If the message is being created by a computer—instead of by a mobile device—the service provider provides a short code such that the message may be transported through the service provider's network. The short code enables non-mobile devices to send and receive SMS messages. The SMS messages comprise user data to simply be displayed on the mobile device. However, when a customer forgets his/her mobile device at another location, the customer is unable to access the services.

In one embodiment, the method of the present disclosure provides a service that enables the user to control the mobile device via an enhanced SMS message. The enhanced SMS message is used to send command and/or control messages to the mobile device which are to be executed by the mobile device. The enhanced SMS message is also referred to as a "masked SMS" message. The "masking" signifies that the mobile device is being controlled from another device.

In one embodiment, the masked SMS message comprises one or more control and/or command messages and a code. The code enables the mobile device to determine that a received message is a masked SMS message. The masked SMS message is parsed such that the control and/or command messages can be retrieved. Unlike regular SMS messages, the masked SMS messages are not to be displayed to the user.

In one embodiment, the masked SMS message also comprises information needed for authenticating the sender of the masked SMS message. For example, the information needed for authentication may comprise one or more of: an identity of the sender, password, retina scan, finger print, etc.

In another embodiment, the masked SMS message is authenticated via a pre-determined method of authentication. For example, the mobile device may be configured to authenticate a received masked SMS message by initiating a call to a pre-arranged phone number of the sender, and providing a challenge to the sender. For example, if the authentication requires providing a password, the mobile device may place a call to the pre-arranged phone number to receive the password (e.g., verbally or via text) and verify that the masked SMS message was received from an authorized user. Note that the present disclosure may be practiced with any standard authorization and/or authentication method ordinarily known in the art, without limiting the enhanced SMS messaging service.

In one embodiment, an application for creating and parsing the masked SMS messages is implemented in the user endpoint devices, e.g., mobile devices and/or computers. A first user endpoint device creates a masked SMS message using the application. The masked SMS message that is created is then sent to a second user endpoint device. The second user endpoint device receives the masked SMS message, and if the sender is successfully authenticated, the second user endpoint device parses the masked SMS message to retrieve the one or more control and/or command messages. The second user endpoint device then acts on the one or more control and/or command messages that are retrieved. As such, the user endpoint devices that are sending and receiving the masked SMS messages need to be compatible. For example, two cell phones exchanging masked SMS messages need to run compatible applications such that the transmitted content (e.g., the control and/or command messages) can be parsed and understood.

In one embodiment, the application for creating and/or parsing the masked SMS messages is device specific. For example, the user may be sending a command for controlling and/or activating features of his/her cell phone by sending a masked SMS message to the cell phone from another device. If the command for controlling and/or activating the features of the cell phone are device specific, the application for creating and/or parsing the masked SMS message may be device specific as well. The parsing enables the cell phone that receives the masked SMS message to retrieve and act upon the control and/or command messages. For example, a mobile device may activate one or more of its features in accordance to a command, e.g., taking a picture using the camera on the mobile device, reporting its current location, e.g., reporting its Global Positioning System (GPS) coordinates, recording audio signals via the microphone of the mobile device, accessing a database located on the mobile device, and so on.

In one embodiment, the application for creating and/or parsing the masked SMS message is provided as an enhancement to a native messaging application of the mobile device. In another embodiment, the application for creating and/or parsing the masked SMS message is independent of the native messaging application of the mobile device, e.g., a separate application.

In another embodiment, the application for creating the masked SMS message is implemented in an application server located in the service provider network. The network service provider may then provide the enhanced (masked) SMS messaging service to subscribers via the application server and a web server. The subscriber may then input the control and/or command messages and invoke the masked SMS messaging service by clicking on an icon or a similar symbol (e.g., provided by the web server via one or more web pages). The subscriber's device is then able to enter the appropriate code such that the application server and the intended recipient are able to determine that the message is a masked SMS message.

In another embodiment, the application server may simply provide a code to the subscriber's device to be used for indicating that a message is a masked SMS message.

In one embodiment, the code that indicates that the message is a masked SMS message enables the recipient (e.g., a receiving endpoint device) of the masked SMS message to parse the masked SMS message without logging it. For example, the code may precede the command and/or control messages included in the message payload. For example, the sending device may create a masked SMS message that comprises: the code that indicates that the message is a masked SMS message, one or more command and/or control messages, and a message header that is needed for transportation through a network.

In one embodiment, the command and/or control message may be for generating a text-to-speech (TTS) call to a landline telephone. For example, a traditional landline telephone may not be able to receive text messages. Then, after parsing a masked SMS message, the recipient of the masked SMS message, or the application server (213), may retrieve a command from the masked SMS message to invoke a TTS server API for generating a TTS call to a landline telephone. The landline telephone may then be able to receive the message in a speech format.

In one embodiment, the TTS call may be for one landline telephone. In another embodiment, the TTS call may be for multiple landline phones. For example, the TTS call may be for broadcasting a message to multiple landline telephones that are unable to receive text messages.

In one embodiment, a user endpoint device may create and send the masked SMS message to multiple user endpoint devices. For example, the masked SMS message may be used to mimic and control multiple user endpoint devices.

In one embodiment, a user endpoint device may create and send the masked SMS message to multiple virtual personas. For example, the masked SMS message may be used to mimic and control multiple virtual personas that are instantiated in one or more user endpoint devices. For example, a first virtual persona may be instantiated in a user endpoint device for placing calls to clients, a second virtual persona may be instantiated for placing calls to suppliers, a third virtual persona may be instantiated for placing calls of personal nature, etc. A user may then send a masked SMS message to the desired persona such that calls are placed to the intended list of recipients associated with the desired persona.

In one example, the user may not have his/her cell phone while traveling but may still wish to send an SMS message to a list of recipients from his/her cell phone. The user may then send the masked SMS message to a persona instantiated in his/her cell phone. The masked SMS message may be sent to the cell phone (e.g., a second cell phone) via a computer or another cell phone (e.g., a first cell phone). For example, the second cell phone may then parse the received masked SMS message, retrieve the commands, and send the SMS message in accordance with the commands that are received from the computer or first cell phone. From the perspective of the recipients of the SMS message, the sender appears to be using the second cell phone—not the computer or first cell phone that sent the initial masked SMS message.

A control and/or command message from a first user endpoint device may comprise a command to originate a call, to send an SMS message, to change the settings of the second user endpoint device, to activate a function of the second user endpoint device, to play music, etc. If the second user endpoint device originates a call or sends an SMS message, the call or message appears to the recipient of the message, e.g., to a third user endpoint device, as if the call was originated from the second user endpoint device. The recipient of the message does not know that the second user endpoint device received the initial control and/or command message from the first user endpoint device.

In another example, the user's cell phone may be in communication with a computer, e.g., via a Bluetooth standard connection. The user may wish to initiate a voice call to a contact without the need to use the cell phone's keypad, display, etc. For example, the computer may have peripherals (keyboard, speaker, display, etc.) that are more convenient. The user may then send to the cell phone a masked SMS message. The cell phone may then parse the masked SMS message and place the call to the contact. If the contact picks up the call, the user may then communicate with the contact via the peripherals (e.g., microphones, speakers, headsets, webcam and the like) of the computer.

Returning to FIG. 1, the network 100 comprises a User Endpoint (UE) device 102 communicating with a network 110 via a wireless access network 101, and UE devices 105 and 106 communicating with the network 110 via a wireless access network 108. In this illustrative example, UE 102 is the target device and is a 2G/3G cell phone that can be controlled/commanded remotely through a masked SMS. The commanding device can be a wired UE 106 or wireless UE 105 which has access to the IP network 110 provided by a service provider.

To simplify the example, the network 110 is only illustrated as comprising an SMSC 221, a web server 222 and an application server 213. In one embodiment, the web server 222 hosts an HTML page that depicts capabilities of the target UE 102 using icons and data. Although the network 110 may comprise other network elements, FIG. 1 includes only the components that are needed to describe the current method and apparatus.

In one embodiment, the network service provider provides the masked SMS messaging service to subscribers via the application server 213. When UE 105 or UE 106 wishes to command UE 102 to perform a function (e.g., send an SMS/MMS, make a call, send location, etc.), the UE 105 or UE 106 interact with the web pages served by the web server (222). The web server interacts with the application server 213 which generates a masked SMS with a short code and invokes the APIs provided by the SMSC to send the masked SMS to the target UE 102.

In one embodiment, the masked SMS contains instructions and data for target UE device 102 to perform the requested action or function (e.g., send SMS, make a call, send back location, invoke a web site, etc.). Additionally, the application server 213 can check the device capability of the target UE device 102 by invoking an API (not shown) to ensure the masked SMS contains instructions that are executable by the target UE 102. The API to send a masked SMS through SMSC can be opened to third party developers 109. The target UE device 102 will have an application that can parse, decode, and execute the received masked SMS. However, the masked SMS received by the target UE device 102 is not visible to the user.

The application for parsing masked SMS messages is implemented in UE 102. In one example, the application to send a masked SMS is a web application that can be loaded into a browser by UE 105 or UE 106 when interacting with the web server 222. The subscriber may then input the control and/or command messages and invoke the masked SMS messaging service by clicking on an icon or a similar symbol on the UE for originating the masked SMS message via the web server 222. The intended recipient device, e.g., UE 102, is then able to determine that the message is a masked SMS message and should be treated accordingly.

UE 102 receives the masked SMS message, where UE 102 will determine that the message is a masked SMS message. For example, for all SMS messages (standard and enhanced) the application on UE 102 may search for the code (e.g., any alphanumeric character or string of alphanumeric characters) provided by the application server 213. If the code is not included, the method stores the message in accordance with the native messaging service. If the code is included, UE 102 determines that the message is a masked SMS message. The method then proceeds to authenticate the sender. If the sender is successfully authenticated, UE 102 retrieves one or more command and/or control messages by parsing the masked SMS message. For example, UE 102 may retrieve a command from the masked SMS message to send an SMS message (e.g., a standard SMS message) to another smartphone (not shown) using the service provider's 2G/3G network.

In another example, the command received by UE 102 may instruct UE 102 to determine its own physical location (e.g., in accordance with a global positioning system of the UE), and send the location to a predetermined server. For example, the owner of the UE may have misplaced the UE 102. The owner may then send a command to the UE 102 via a masked SMS message. The command may then be received by the UE 102 to enable the owner to locate the UE 102, e.g., via website that stores the reported location of UE 102.

In another embodiment, the masked SMS message is sent through the service provider's network without a need to obtain a code from the application server 213. The sending and receiving UEs agree upon a code to be used for identifying masked SMS messages after proper authentication. The overhead used for transporting the packets through the service provider network is unaffected.

For example, UE 105 may create an SMS message that contains all the necessary information to form the message header needed for transportation and the message body containing the payload. However, the payload may have two components: (1) a code for indicating that the message is a masked SMS message, and (2) command and/or control messages. The message is then sent to UE 102 through the service provider's network via a standard SMS messaging service. Then, UE 102 receives the SMS message, where UE 102 will search for the agreed upon code to determine if the received message is a standard SMS message or a message preceded by the agreed upon code for identifying a masked SMS message. If the message comprises the code, UE 102 concludes that the message is a masked SMS message. UE 102 then proceeds to authenticate UE 105. If UE 105 is successfully authenticated, the masked SMS message is then parsed to retrieve the command and/or control messages to be acted on by UE 102.

Figure 2:
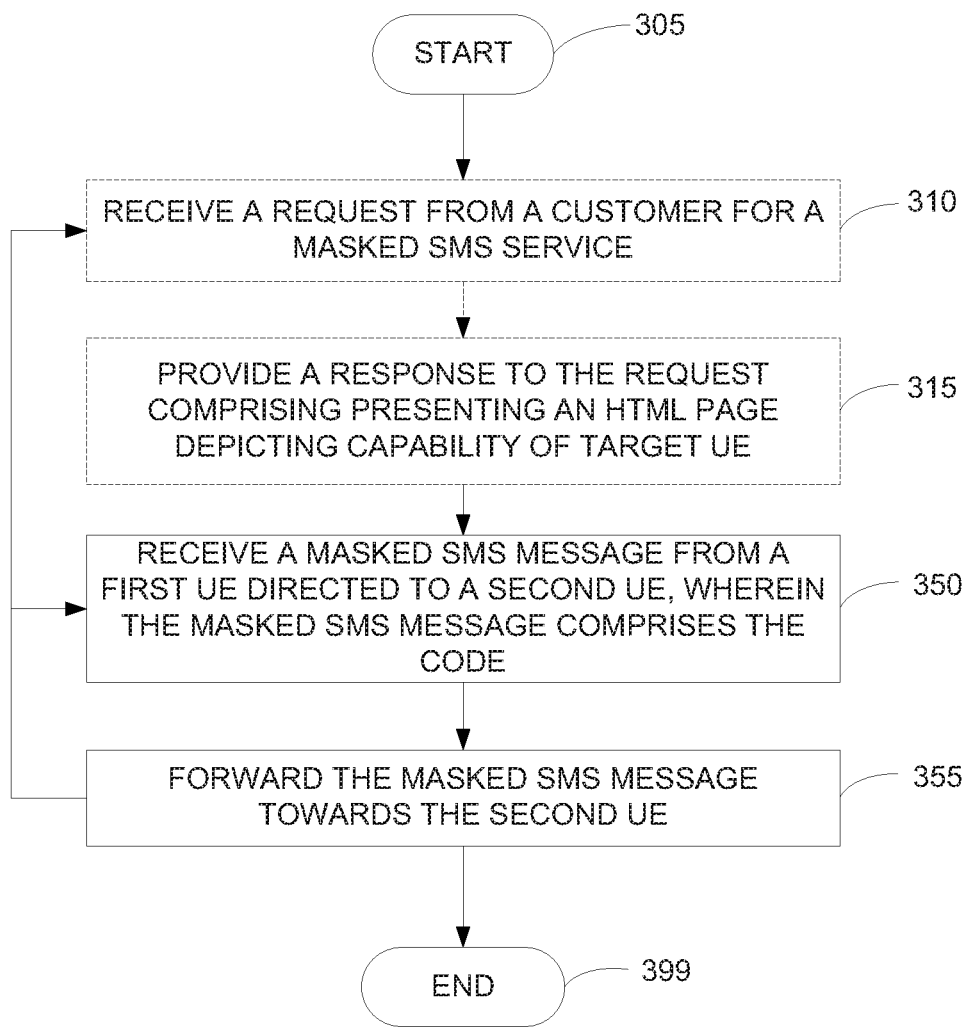
FIG. 2 illustrates a flowchart of a method for providing a masked SMS service.

FIG. 2 illustrates a flowchart of a method 300 for providing a masked SMS service. In one embodiment, method 300 may be implemented in an application server of a network service provider or a general purpose computer as disclosed below. Method 300 starts in step 305 and proceeds to step 310.

In optional step 310, method 300 receives a request from a customer for a masked SMS service. For example, a customer may subscribe to a masked SMS messaging service provided by the network service provider.

In optional step 315, method 300 provides a response to the request, wherein the response comprises presenting an HTML page that depicts one or more capabilities of the target UE 102 using icons and data. Alternatively, the response may comprise a code to be used by UE 105 for indicating that a SMS message is a masked SMS message.

In one embodiment, the response may also comprise an address (e.g., a universal resource locator (URL), IP address, etc.) of a server from which the customer may download to a user endpoint device an application for creating and/or parsing a masked SMS message. For example, the customer may click on a URL link to reach a server where the application is located. The customer may then be able to download the application to the UE, e.g., a mobile device, a computer, etc.

The application for creating and/or parsing masked SMS messages is then implemented in the customer's UE. The customer invokes the application such that the masked SMS message is created and sent towards another UE. For example, the customer may click on an icon on the UE, enter the intended destination UE (or UEs), enter one or more command and/or control messages, authentication information (if applicable), etc., and create the masked SMS message. The UE inserts the code provided by the application server prior to forwarding the message to the service provider's network.

In step 350, method 300 receives a masked SMS message from a first UE (e.g., UE 105) directed to a second UE (e.g., UE 102). In one embodiment, the method 300 receives inputs from a user of UE 105 via the web pages served by the web server 222. This interaction with the web pages served by the web server 222 will cause the AS 213 to generate the masked SMS. Alternatively, if the web server 222 is not implemented, then the method 300 may simply receive the masked SMS message directly from the first UE (e.g., 105) wherein the masked SMS message comprises the code for indicating that the message is a masked SMS message. For example, the application server 213 may receive the masked SMS message and determine that the message contains the code that was provided to the UE of a customer for creating the masked SMS message. Thus, it should be noted that the step "receiving a message from a first UE" should be broadly interpreted as receiving inputs from the first UE for the creation of the masked SMS message by the AS 213 or simply receiving the masked SMS message itself from the first UE, i.e., the masked SMS message is created by the first UE. Said another way, the received message from UE 105 is either inputs for use with a web server or the message is actually the masked SMS message it.

In step 355, method 300 forwards the masked SMS message towards the second UE. For example, the second user endpoint device may also be a subscriber of the service and the application for parsing the masked SMS message may have been downloaded to the second UE.

Then, the second UE receives the masked SMS message, and determines from the code that the message is a masked SMS message. For example, for all SMS messages (standard or masked) the application on the second UE may search for the code provided by the application server. If the code is not detected, the method processes the message in accordance with the standard messaging service. If the code is detected, the second UE determines that the SMS message is a masked SMS message. The method then proceeds to authenticate the first UE. If the first UE is successfully authenticated, the second UE retrieves the one or more command and/or control messages by parsing the masked SMS message. Then, the second UE processes the commands and/or control messages that are retrieved from the masked SMS message. The method then proceeds to either step 350 to continue receiving additional masked SMS messages, to step 310 to receive another request for service, or to step 399 to end the process.

Figure 3:
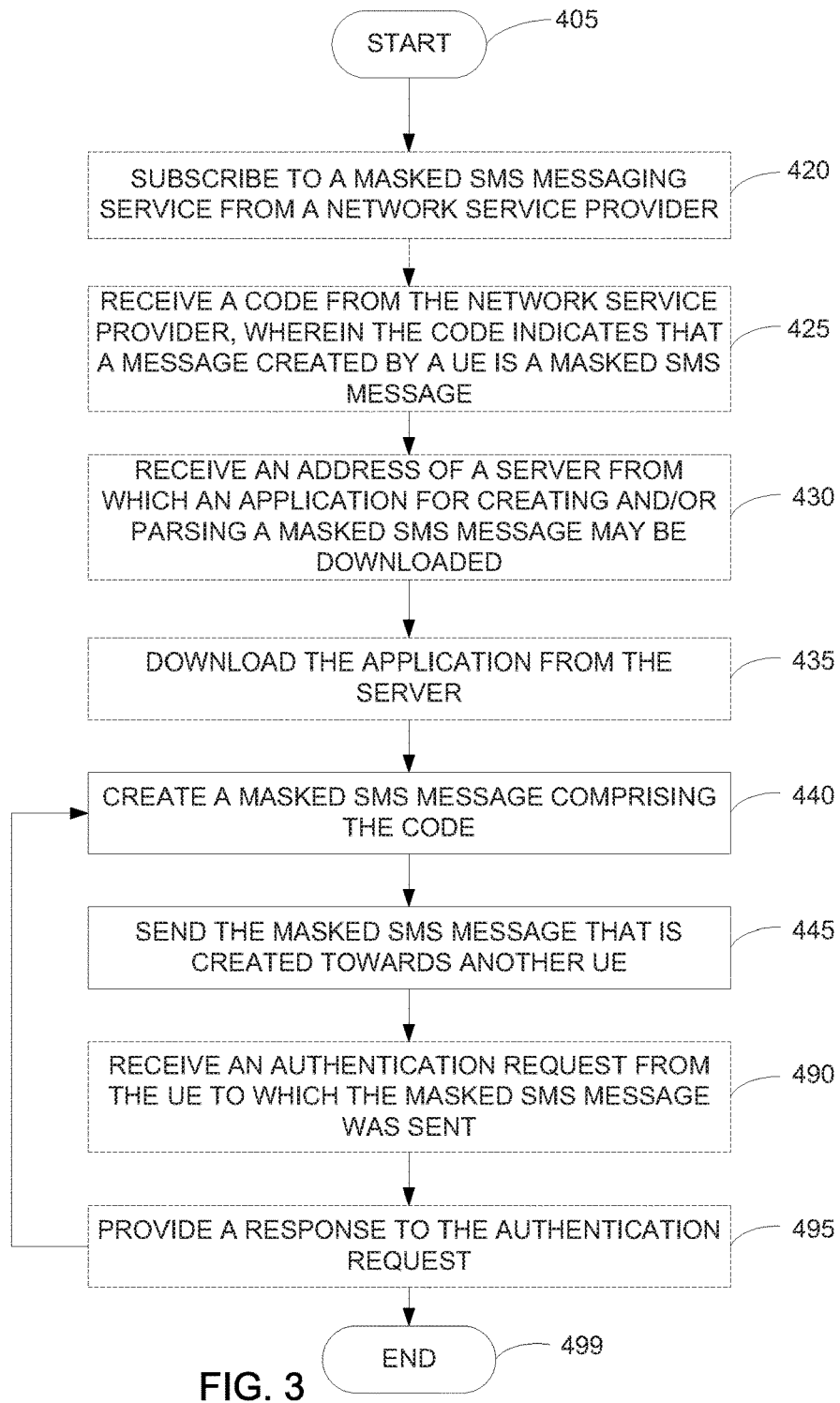
FIG. 3 illustrates a flowchart of a method for sending a masked SMS message by an endpoint device.

FIG. 3 illustrates a flowchart of a method 400 for sending a masked SMS message by an endpoint device in accordance with a masked SMS service provided by a network service provider. In one embodiment, method 400 of the present disclosure may be implemented in a user endpoint device or a general purpose computer as disclosed below. Method 400 starts in step 405 and proceeds to step 420.

In optional step 420, method 400 subscribes to a masked SMS messaging service from a network service provider.

For example, the customer may subscribe to a service that enables the customer to send and/or receive masked SMS messages.

In optional step 425, method 400 receives a code from the network service provider, wherein the code indicates that a message created by a UE is a masked SMS message.

In optional step 430, method 400 receives an address (e.g., a URL, an IP address, etc.) of a server from which an application for creating and/or parsing a masked SMS message may be downloaded to a user endpoint device.

In optional step 435, method 400 downloads the application from the server. In an alternate embodiment, the application may be downloaded to a UE from another location. For example, the application may be downloaded from an independent supplier, from the manufacturer of the mobile device, etc. In yet another embodiment, the native SMS messaging capability may enable a UE to create and/or parse masked SMS messages.

In step 440, method 400 creates a masked SMS message comprising the code. For example, the customer may invoke the application such that the masked SMS message is created and sent towards another UE. For example, the customer may click on an icon, enter the intended destination, enter one or more command and/or control messages, authentication information (if applicable), etc., and command the UE to create the masked SMS message. The UE creates the masked SMS message and inserts the code provided by the application server. Alternatively, step 440 may comprise an interaction with a web server 222 by providing the necessary inputs via one or more presented web pages (e.g., selecting a target UE, receiving a list of capabilities of the target UE, selecting the type of operations to be performed via a masked SMS message and the like). In other words, the UE does not generate the mask SMS message by itself in this embodiment, but instead cause the AS 213 in conjunction with the web server 222 to generate the masked SMS message.

In step 445, method 400 sends the masked SMS message that is created towards another UE through the network service provider.

In optional step 490, method 400 receives an authentication request from the UE to which the masked SMS message was sent.

In optional step 495, method 400 provides a response to the authentication request. The method then proceeds to step 440 to create another message, or to step 499 to end processing the current SMS message.

Figure 4:
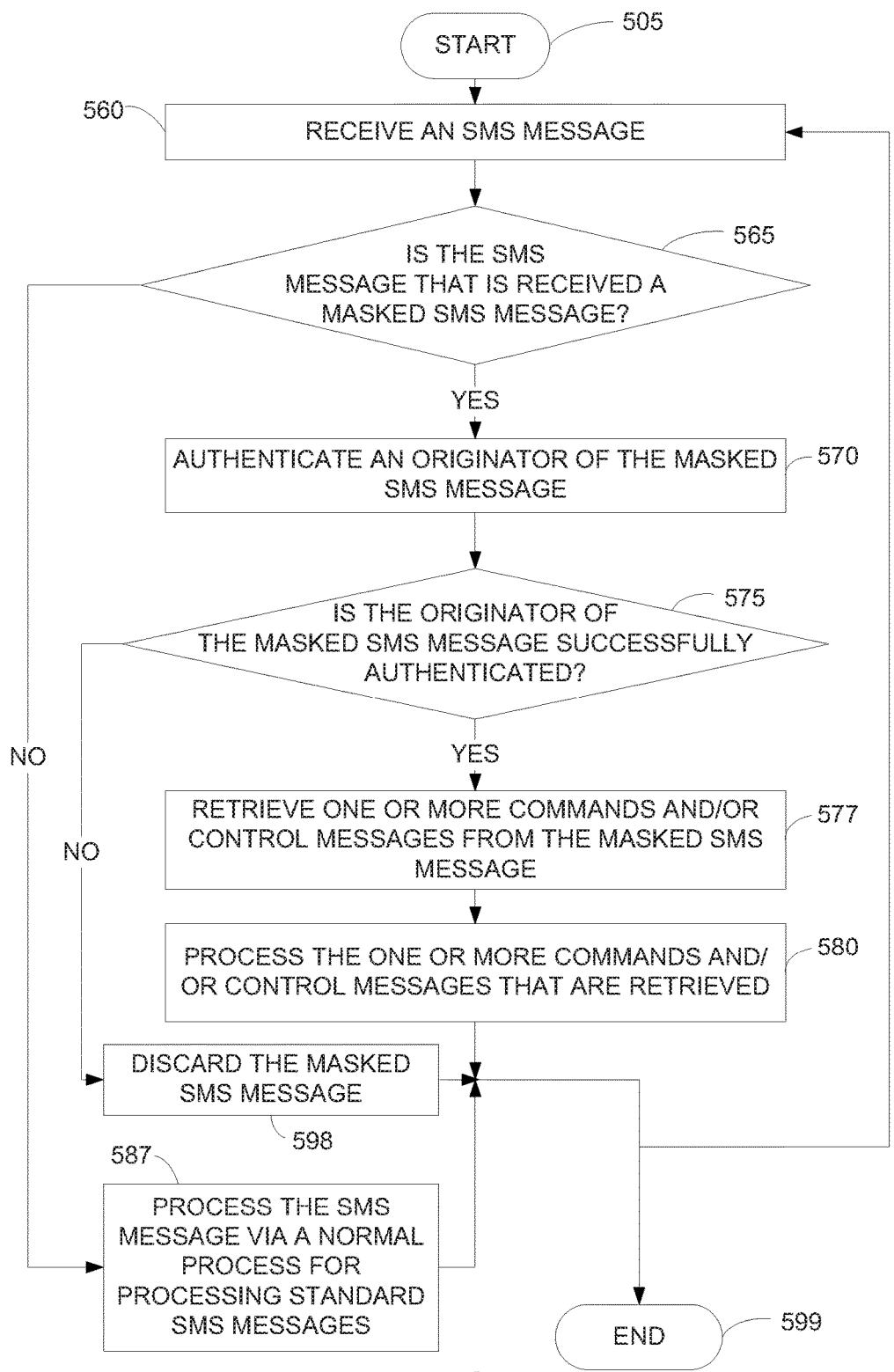
FIG. 4 illustrates a flowchart of a method for receiving a masked SMS message by an endpoint device.

FIG. 4 illustrates a flowchart of a method 500 for receiving a masked SMS message by an endpoint device in accordance with a masked SMS service provided by a network service provider. In one embodiment, method 500 of the present disclosure may be implemented in a user endpoint device or a general purpose computer as disclosed below. Method 500 starts in step 505 and proceeds to step 560.

In step 560, method 500 receives an SMS message. For example, the method may receive either a standard SMS message or a masked SMS message.

In step 565, method 500 determines whether or not the SMS message that is received is a masked SMS message. For example, for all SMS messages, the method may search for a code that indicates that an SMS message is a masked SMS message. For example, the method may search for a code provided by an application server of a service provider when the UE subscribed to the masked SMS service. If the SMS message is a masked SMS message, the method proceeds to step 570. Otherwise, the method proceeds to step 587.

In step 570, method 500 authenticates an originator of the masked SMS message. In one example, the method may request a password from the device that originated the masked SMS message. In another example, the method may place a call to the originator of the masked SMS message. In another example, the method may verify via another server or pre-arranged method if the source of the masked SMS message can be authenticated.

In step 575, method 500 determines if the originator of the masked SMS message is successfully authenticated. If the originator is successfully authenticated, the method proceeds to step 577. Otherwise, the method proceeds to step 598.

In step 577, method 500 retrieves one or more command and/or control messages from the masked SMS message. For example, the method may parse the masked SMS message to identify the one or more command and control messages.

In step 580, method 500 processes or executes the one or more commands and/or control messages that are retrieved. The method then proceeds to step 560 to receive another message, or to step 599 to end processing the current message.

In step 587, method 500 processes the SMS message via a normal process for processing standard SMS messages, e.g., displaying the SMS message. The method then proceeds to step 560 to receive another message, or to step 599 to end processing the current message.

In step 598, the method discards the masked SMS message. The method then proceeds to step 560 to receive another message, or to step 599 to end processing the current message.

It should be noted that the various control functions are broadly described as functions. As such, these various control functions can be deployed in any number of network elements, e.g., a routing device, a router, a switch, a border element, a gateway, an application server and the like.

It should be noted that although not specifically specified, one or more steps of methods 400 and 500 may be implemented in a same user endpoint device. For example, the user endpoint device may be able to both send and receive masked SMS messages.

It should be noted that although not specifically specified, one or more steps or operations of each of the respective methods 300-500 may include a storing, displaying and/or outputting step as required for a particular application. In other words, any data, records, fields, and/or intermediate results discussed in each of the respective methods can be stored, displayed and/or outputted to another device as required for a particular application. Furthermore, steps, blocks, or operations in each of FIGS. 2-4 that recite a determining operation or involve a decision do not necessarily require that both branches of the determining operation be practiced. In other words, one of the branches of the determining operation can be deemed as an optional step.

Figure 5:
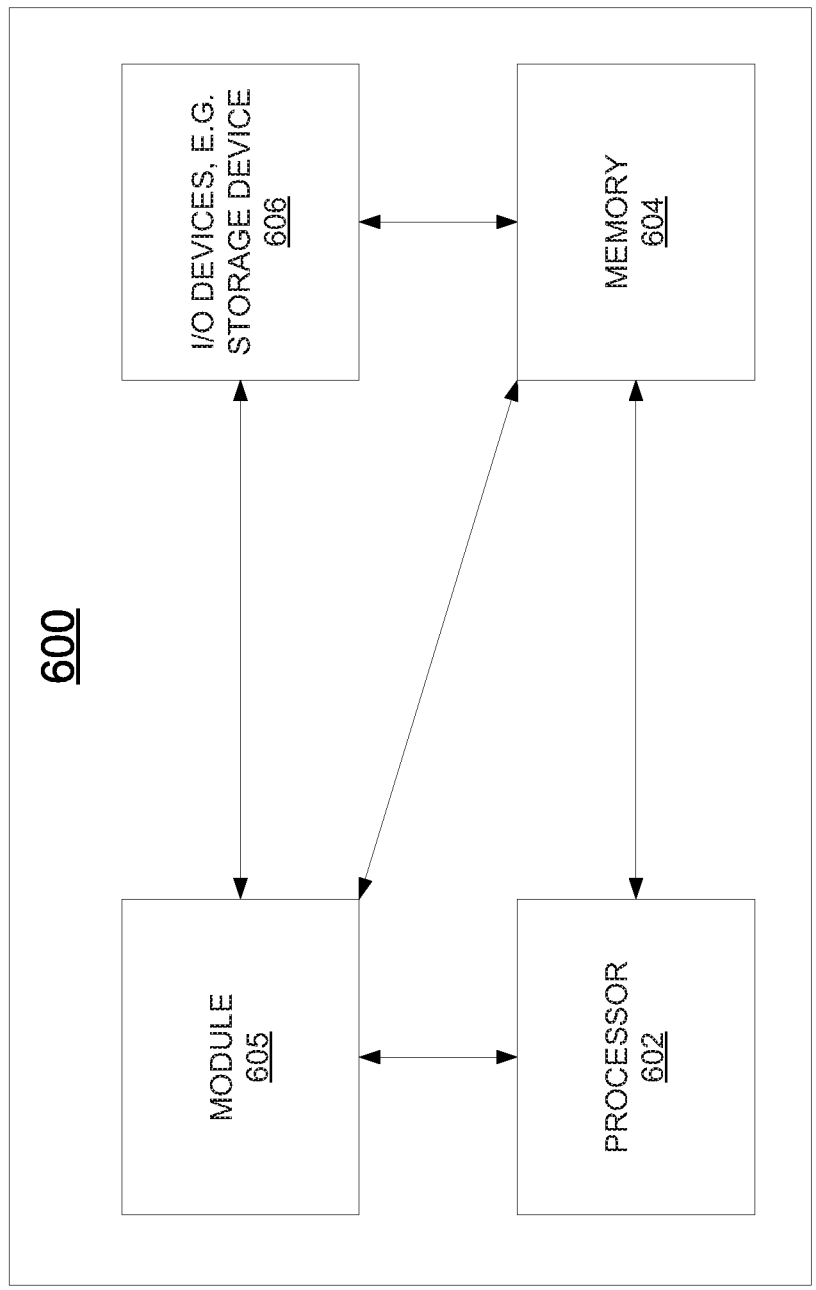
FIG. 5 depicts a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 600 comprises a hardware processor element 602 (e.g., a microprocessor, a central processing unit (CPU) and the like), a memory 604, e.g., random access memory (RAM) and/or read only memory (ROM), a module 605 for providing a masked SMS service in a network, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents, e.g., computer readable instructions pertaining to the method(s) discussed above can be used to configure a hardware processor to perform operations of the above disclosed methods. For example, a computer-readable medium may be in communication with the processor, where the computer-readable medium having stored thereon a plurality of instructions (e.g., a software program comprising computer-executable instructions), the plurality of instructions including instructions which, when loaded into memory 604 and executed by the hardware processor, cause the hardware processor to perform the operations (e.g., methods 300-500) as disclosed above.

In one embodiment, the present module or process 605 for providing a masked SMS service can be loaded into memory 604 and executed by processor 602 to implement the functions as discussed above. Alternatively, the hardware processor 502 having executed the computer-executable instructions may cause one or more elements of system 500 to implement one or more functions as discussed above. In other words, the hardware processor may serve the function of a central controller directing other devices to perform the one or more operations as discussed above.

As such, the present method 605 for providing a masked SMS service in a wireless network (including associated data structures) of the present disclosure can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
receiving, by a processor of a first endpoint device, from a second endpoint device a masked short message service message with a code, wherein the second endpoint device received an application for creating the masked short message service message from an application server of a network service provider, wherein the code was previously received by the second endpoint device from the application server of the network service provider, wherein the masked short message service message comprises a command to be executed by the first endpoint device; and
processing, by the processor, the command.

2. The method of claim 1, further comprising:
sending, by the processor, an authentication request to the second endpoint device.

3. The method of claim 2, further comprising:
receiving, by the processor, a response to the authentication request.

4. The method of claim 1, wherein the code is provided to the first endpoint device by the application server of the network service provider.

5. The method of claim 4, wherein the code is provided to the first endpoint device in a response to a request sent by the first endpoint device to the network service provider.

6. The method of claim 1, wherein the masked short message service message is parsed by the first endpoint device.

7. The method of claim 1, wherein the first endpoint device receives an application for parsing the masked short message service message from the application server of the network service provider.

8. The method of claim 1, wherein the first endpoint device determines the masked short message service message by searching for the code.

9. The method of claim 8, wherein the first endpoint device authenticates the second endpoint device when the masked short message service message is received.

10. The method of claim 9, further comprising:
retrieving, by the processor, a command message from the masked short message service message, when the second endpoint device is successfully authenticated.

11. The method of claim 10, further comprising:
processing, by the processor, the command message that is retrieved.

12. The method of claim 1, wherein the second endpoint device is a computer.

13. The method of claim 1, wherein the second endpoint device is a mobile endpoint device.

14. The method of claim 13, wherein the mobile endpoint device comprises a smart phone.

15. The method of claim 1, wherein the first endpoint device is a mobile endpoint device.

16. A non-transitory computer-readable storage medium to store a plurality of instructions which, when executed by a processor of a first endpoint device, cause the processor to perform operations, the operations comprising:
receiving from a second endpoint device a masked short message service message with a code, wherein the second endpoint device received an application for creating the masked short message service message from an application server of a network service provider, wherein the code was previously received by the second endpoint device from the application server of the network service provider, wherein the masked short message service message comprises a command to be executed by the first endpoint device; and
processing the command.

17. The non-transitory computer-readable storage medium of claim 16, the operations further comprising:
sending, by the processor, an authentication request to the second endpoint device.

18. An apparatus comprising:
a processor of a first endpoint device; and
a computer-readable medium storing a plurality of instructions which, when executed by the processor, cause the processor to perform operations, the operations comprising:
receiving from a second endpoint device a masked short message service message with a code, wherein the second endpoint device received an application for creating the masked short message service message from an application server of a network service provider, wherein the code was previously received by the second endpoint device from the application server of the network service provider, wherein the masked short message service message comprises a command to be executed by the first endpoint device; and
processing the command.

19. The apparatus of claim 18, the operations further comprising:
   sending an authentication request to the second endpoint device.

20. The apparatus of claim 18, wherein the code is provided to the first endpoint device by the application server of the network service provider.

* * * * *